May 18, 1965
L. C. PARKER ETAL
3,183,993
SPEED CONTROL SYSTEM
Filed June 7, 1961
3 Sheets-Sheet 1
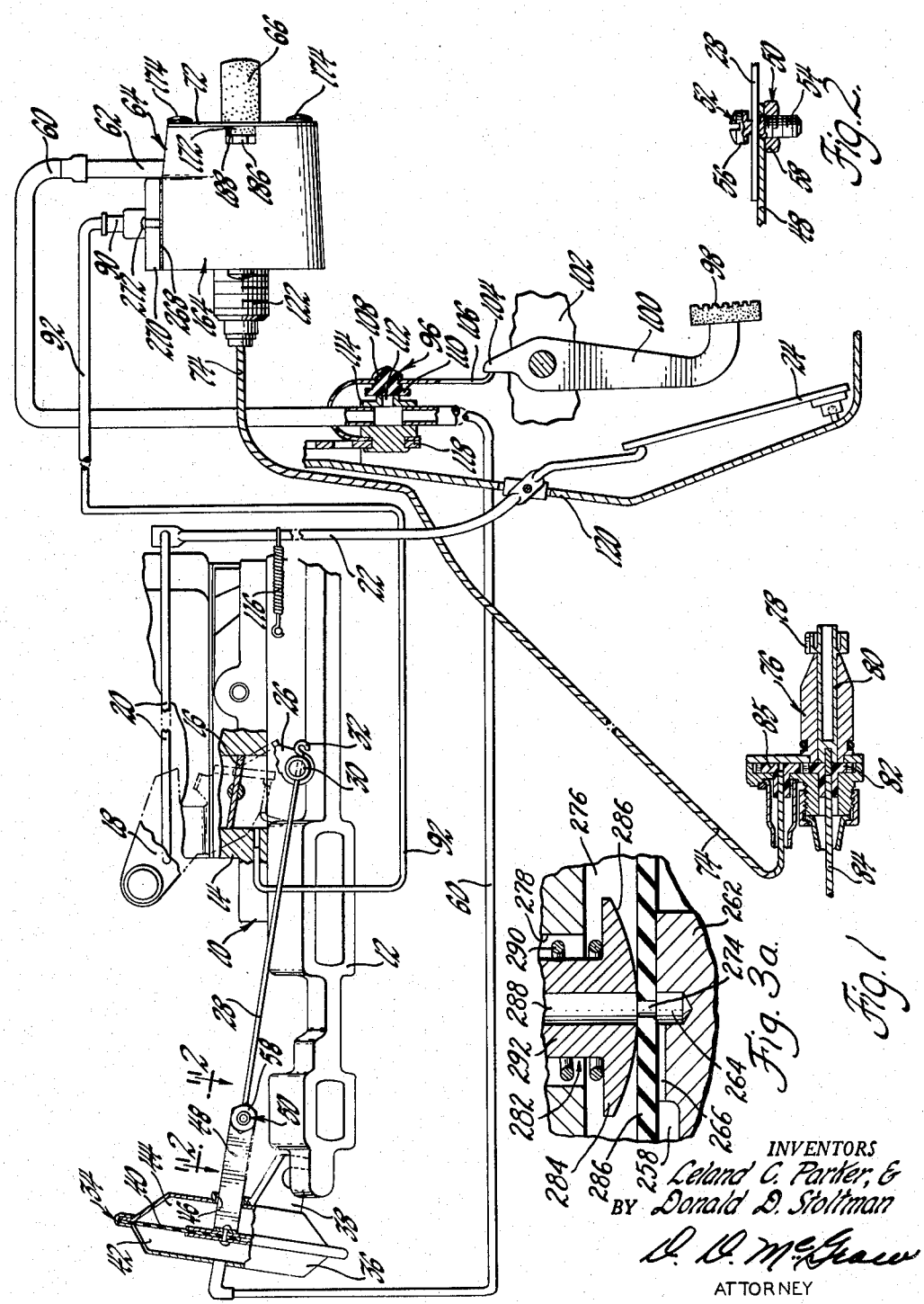
INVENTORS
Leland C. Parker, &
BY Donald D. Stoltman
ATTORNEY

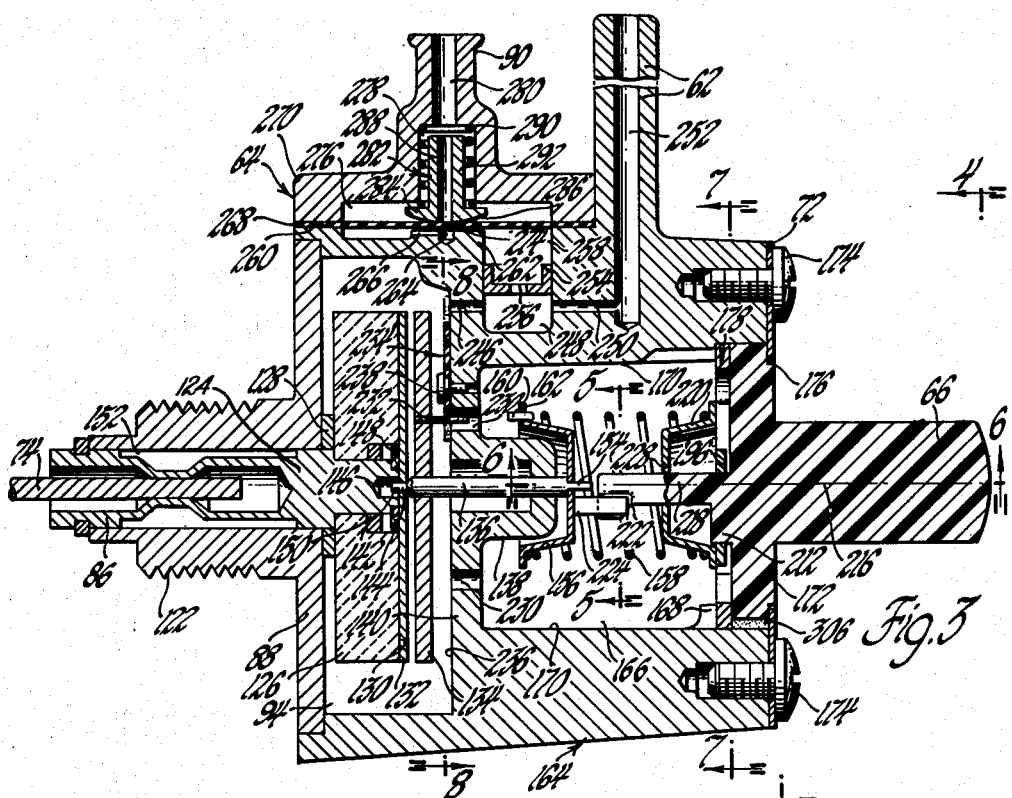
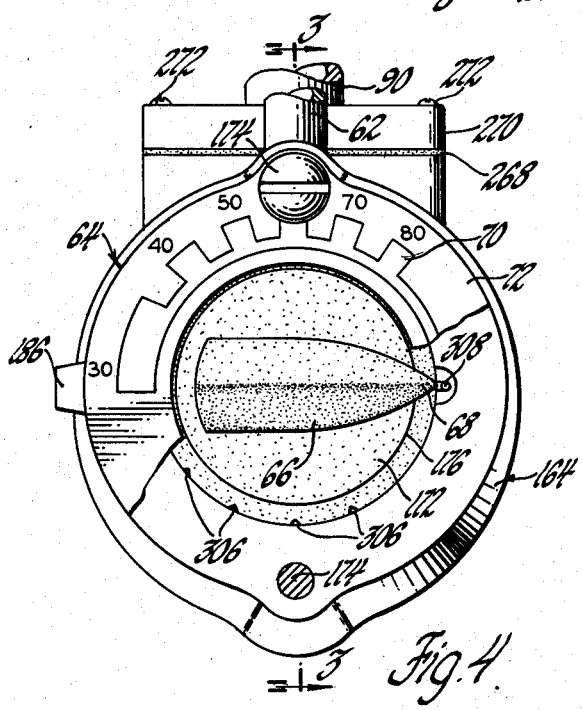
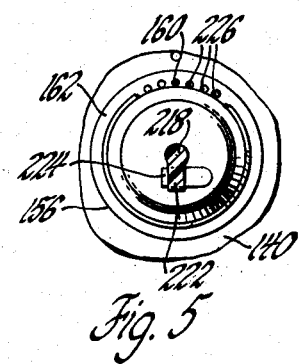

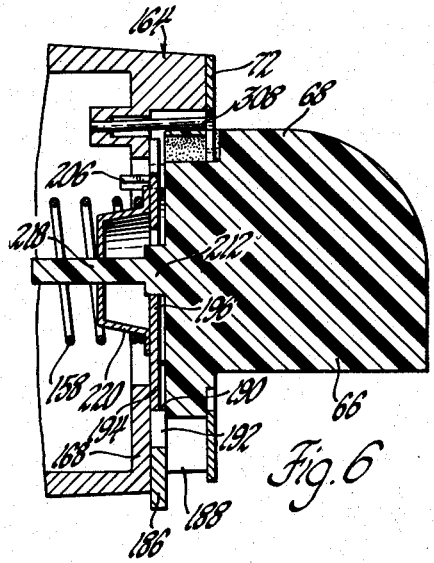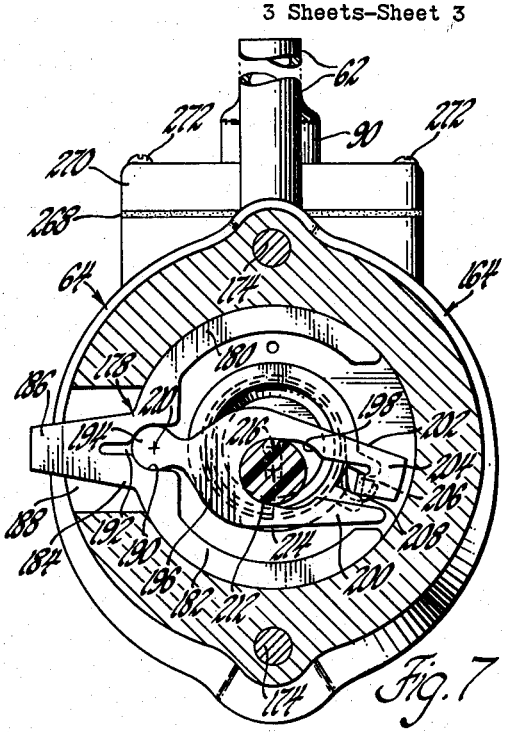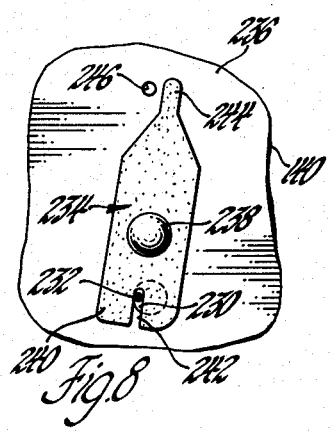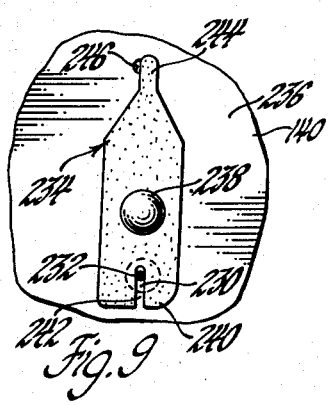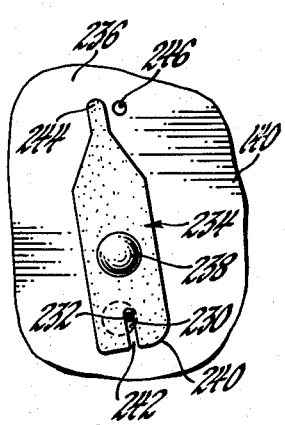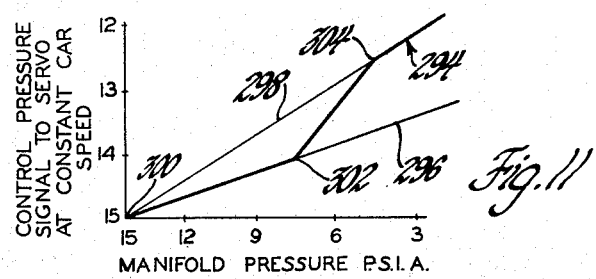
INVENTORS
Leland C. Parker, &
BY Donald D. Stoltman
ATTORNEY

United States Patent Office 3,183,993
Patented May 18, 1965

3,183,993
SPEED CONTROL SYSTEM
Leland C. Parker, Rochester, and Donald D. Stoltman, Henrietta, N.Y., assignors to General Motors Corporation, Detroit, Mich., a corporation of Delaware
Filed June 7, 1961, Ser. No. 115,539
21 Claims. (Cl. 180—82.1)

The invention relates to a speed control system for controlling engines to maintain a constant speed and more particularly to systems which are capable of maintaining a vehicle at a constant road speed under varying road load conditions. The speed control system embodying the invention provides added convenience for a vehicle operator in that it eliminates the need for continual application of the operator's foot to the accelerator pedal and for the pushing of a reset button to engage an automatic control each time the operator desires to operate the vehicle in the automatic road speed control mode. Normal operator control of the vehicle is available at all times. The only added control insofar as the operation of the system is concerned is the setting of the desired vehicle speed as an input to the system. The driver can take over control from the system at any time by braking, clutching or accelerating without having to perform any other control function.

The system is simple in design while offering optimum operation and driver ease, ease of service and reliability. It may be readily installed in vehicles either as a factory installation or as an aftermarket installation. It is compensated for temperature change so that constant selected speed calibration is maintained.

The system is fail-safe in that should the controlling fluid pressure be lost while the system is in automatic control, control is immediately returned to the operator. The system is compensated against over-shooting and under-shooting characteristics to eliminate hunting. It is provided with a limiting range of speed sensitivity so that it will not become operative until the actual vehicle speed is within a range of speed approximately centered on the desired vehicle speed. This eliminates the undesirable action of some systems wherein they will accelerate a vehicle from a standing start, when engaged, until the vehicle reaches the set speed.

It is preferable to provide the control sensitivity range with a band of approximately 3 to 8 miles per hour on either side of the set desired speed. This prevents abrupt acceleration when the system becomes operative to control the engine throttle and eliminates a potential cause of accidents. The system is also provided with positive lock-out feature by making provision for setting the system control head so that it cannot operate at any speed to control the engine throttle. It is preferred to have the system detent-calibrated to provide a series of detents for the control knob which coincide with several speed settings. The vehicle operator may then set his desired speed without being required to remove his eyes from the road.

In the drawings:

FIGURE 1 is a schematic presentation of a speed control system installed on an engine and embodying the invention. Parts are illustrated in section and broken away;

FIGURE 2 is a cross-section view of a portion of the control linkage of the system of FIGURE 1 and is taken in the direction of arrows 2—2 of that figure;

FIGURE 3 is a cross-section view of the control head of the system of FIGURE 1;

FIGURE 3a is an enlarged view of a portion of FIGURE 3;

FIGURE 4 is a view of the control head of FIGURE 3 taken in the direction of arrows 4—4 of that figure and having parts broken away and in section;

FIGURE 5 is a partial section view showing a portion of the control head of FIGURE 3 with parts broken away and taken in the direction of arrows 5—5 of that figure;

FIGURE 6 is a partial section view of another portion of the control head of FIGURE 3 with parts broken away and taken in the direction of arrows 6—6 of that figure;

FIGURE 7 is another sectional view of the control head of FIGURE 3 taken in the direction of arrows 7—7 of that figure;

FIGURES 8, 9 and 10 are partial section views showing the various operational positions of a valve in the control head of FIGURE 3 and taken in the direction of arrows 8—8 of that figure; and FIGURE 11 is a curve illustrating the pressure differential signal delivered to the servo of the system of FIGURE 1 at a constant vehicle speed with decreasing absolute manifold pressure and showing the modulating operational characteristics of a portion of the control head.

The system embodying the invention as generally disclosed in FIGURE 1 is preferably installed in a vehicle to control the engine 10 and, therefore, the vehicle speed. The engine is provided with an intake manifold 12 on which is mounted a carburetor 14 for introducing a suitable fuel-air mixture under control of the throttle valve 16. A throttle link 18 connected to rotate the throttle valve 16 is actuated through throttle links 20 and 22 by the accelerator pedal 24. The accelerator pedal 24 is controllable by the vehicle operator in the usual manner. A throttle link 26 is also provided, and may be a part of the existing throttle linkage, to which the servo throttle link control rod 28 is attached by pin 30. Pin 30 is preferably formed with a passage extending transversely therethrough in which rod 28 is slidably received. The rod may have an end 32 which engages pin 30 to move the throttle link 26, and therefore the throttle valve 16, to open the throttle valve under influence of force produced by the power servo 34. Servo 34 includes a servo housing 36 mounted to a suitable part of the engine such as a portion of the intake manifold 12 by a mounting bracket 38. Housing 36 has a diaphragm 40 dividing the inner portion of the housing into a control chamber 42 and an atmospheric chamber 44. The latter chamber is maintained at atmospheric pressure at all times through the opening 46 provided for the diaphragm arm 48. Other suitable atmospheric air inlet means may be provided if desired. Arm 48 is connected to rod 28 by a bolt and nut assembly 50 which is preferably constructed in the manner shown in FIGURE 2 to provide a simple installation adjustment. Assembly 50 includes a bolt 52 through which a passage is transversely formed in the bolt shank 54 adjacent the bolt head 56. Rod 28 is received in this passage so that it lies immediately adjacent arm 48 when the bolt is installed through an opening in one end of the arm. It is preferable that arm 48 and rod 28 be in substantial alignment although considerable misalignment may be necessary in some installations and is permissible without adversely affecting the operation of the system. Rod 28 is moved in the bolt passage until the rod is at the proper effective length when the rod end 32 engages pin 30. The nut 58 is then tightened on bolt 52 on the opposite side of arm 48 from rod 28 and the rod is held tightly in the desired position.

A control pressure line 60 is secured to the servo housing 36 so that control pressure may be impressed on diaphragm 40 through control chamber 42. Line 60 is connected to a conduit 62 of the control head 64 which forms another basic component of the system. Control head 64 is preferably mounted on or adjacent the vehicle instrument panel in such a position so as to be readily accessible to the vehicle operator. The control head 64 is provided with a speed set knob 66 which may be rotated by the vehicle operator so that the knob pointer 68 indicates the desired vehicle speed on the speed set scale 70 provided on the head cover plate 72.

The control head 64 has, in addition to the desired speed input, an actual vehicle speed input through the control drive cable 74. This cable is preferably driven by a vehicle transmission adapter assembly 76 which may be substituted for the speedometer drive cable adapter usually provided. The assembly drive gear 78 is driven by the transmission output shaft at a speed proportionate to vehicle speed. This gear in turn drives shaft 80, gear 82 and the usual speedometer drive cable 84. Gear 82 drives another gear 85 to which one end of cable 74 is secured for rotation. These gears may be made of a suitable plastic designed to reduce gear friction and noise to a minimum. Drive cable 74 extends into the shaft 86 rotatably mounted in control head back cover 88 to provide the actual vehicle speed input to the control head.

The control head 64 is also provided with an input conduit 90 for a fluid pressure which is illustrated in the preferred embodiment as being raw vacuum from the intake system of the engine 10. Vacuum line 92 is connected with conduit 90 and a suitable portion of the engine intake such as the intake manifold 12 or the vacuum side of the carburetor 14 to conduct fluid pressure to the control head 64. Atmospheric air provides another fluid pressure input to the control head and is conducted to the chamber 94, which has one wall thereof defined by back cover 88 of the control head. Additional description of the manner in which this fluid pressure input is introduced and utilized in the control head is provided below.

In order to provide a safety feature in the system wherein the vehicle operator may render the system inoperative, a brake pedal operated spoiler valve assembly 96 is provided in one of the fluid pressure lines connected with the control head 64 and, therefore, with the power servo 34. Valve assembly 96 will provide atmospheric pressure in control chamber 42 immediately, under positive control of the vehicle operator, to render servo 34 inoperative to control the engine throttle valve 16. It is preferred that the spoiler valve assembly 96 be in control pressure line 60 and that embodiment is illustrated. Valve assembly 96 may also be operated by the vehicle clutch pedal in vehicles having such structure, or additional valve assemblies of the same nature may be provided for that purpose. Similarly, a valve assembly may be provided which operates only when the transmission is in a desired driving condition.

Valve assembly 96 is illustrated in FIGURE 1 as being actuated when the operator engages the vehicle brakes through the brake pedal 98 and brake lever 100. Lever 100 is illustrated as being pivotally mounted to a bracket 102 or other suitable portion of the vehicle body. The connections between brake lever 100 and the vehicle brake system are not illustrated since they are not pertinent to the invention. Lever 100 may be provided with a detent 104 which is in engagement with a spoiler valve operating spring 106 to which the spoiler valve 108 is attached. This valve is preferably provided with a flat valve head 110 and may be loosely received in spring 106 so that it can readily align itself with the mating face of orifice 112 formed in the spoiler valve block 114. Valve block 114 is connected in the control pressure line 60 so that control pressure normally passes through the block when valve 108 is seated to keep orifice 112 closed. When the brake pedal 98 is depressed by the operator, detent 104 is moved to release the pressure of spring 106, holding valve 108 in the orifice closed position, and the spring moves the valve head 110 away from the orifice 112 so that line 60 is vented to atmosphere through the orifice. This immediately vents control chamber 42 of servo 34 to the atmosphere to render the speed control system inoperative to control the throttle valve 16. Under this condition the throttle linkage return spring 116 will return the throttle valve 16 to the zero throttle position since there is no resisting force acting on diaphragm 40 to hold the throttle in the advanced position. In order to provide a suitable mount for spoiler valve assembly 96, a bracket 118 may be secured to the valve block 114 and an appropriate portion of the vehicle such as firewall 120.

The control head 64 is illustrated in greater detail in FIGURE 3. The drive cable 74 is attached to the back cover 88 of the control head in the usual manner for attaching speedometer drive cables to speedometers. The threaded boss 122 is provided for this purpose. Only the rotatable portion of drive cable 74 is illustrated, however. The cable extends into the shaft 86 which is rotatably mounted in boss 122. The magnet 126 is mounted on the end of shaft 124 extending into chamber 94 so that it may be rotated when movement of the vehicle rotates drive cable 74. Bearing 128 may be received between the magnet 126 and the cover 88 and in engagement with those elements to provide a suitable bearing surface. Magnet 126 may be disk-shaped and made of any suitable material such as a magnetic ceramic. It may be provided with a suitable number of magnetic poles spaced circumferentially about the rotating axis of the magnet so that the poles are on the magnet face 130. A temperature compensator plate 132 is attached to the magnet 126 over face 130 so as to compensate the magnetic speed pick-up for ambient temperature changes. A driven disk 134 is supported by a shaft 136 rotatably mounted in a boss 138 formed as a part of the housing wall 140. Wall 140 also provides one wall of the chamber 94 opposite the cover 88. Shaft 136 has a pilot end 142 received in the pilot aperture 144 formed in plate 132 so that shaft 136 is in axial alignment with magnet 126 and shaft 124. The inner end of shaft 124 may be provided with a recess 146 to receive pilot end 142 in spaced relation to the shaft. A suitable seal 148, which also acts as a lubricating element, may be provided from oil-soaked felt to lubricate the pilot end 142. A washer 150 may be made of copper or other suitable material and may be sufficiently resilient to distribute the driving load to the brittle ceramic of which the magnet 126 is formed. The temperature-compensating plate 132 may be made of a nickel-iron alloy and the driven disk 134 may be made of aluminum or copper or other suitable material as is well known in the art. A grease pack may be maintained in the recess 152 in boss 122 through which shaft 124 extends to provide lubrication for that shaft.

The end 154 of shaft 136 extending through boss 138 on the opposite side thereof from disk 134 is provided with a spring seat cup 156 which is non-rotatably secured thereto. A spring 158, which may be of the helical type, has a spring end 160 extending through an aperture provided in a flange 162 of cup 156 so that the spring end 160 is non-rotatably secured to the driven disk 134 through shaft 136 and cup 156. The control head housing 164, of which wall 140 is a part, is provided with a chamber 166 with wall 140 forming one wall thereof. The end of the chamber 166 opposite wall 140 is provided with a shoulder 168 extending radially inward therein from the side wall 170 of the chamber and the desired control speed set mechanism is received within chamber 166 so that shoulder 168 provides an axial locating and spacing member therefor.

The speed set mechanism includes a control set knob 66 having an annular flange 172 received within the outer end of chamber 166 and retained in that chamber by the cover plate 72. This cover plate is secured in position over flange 172 by suitable fastening means such as screws 174. The inner diameter of plate 72 engages a shoulder 176 formed on flange 172 radially inward of the outer circumference of that flange.

The speed setting and adjusting mechanism also includes the adjusting yoke 178 which engages the shoulder 168 and one side of flange 172. This yoke and its associated mechanism are best illustrated in FIGURE 7. The yoke 178 includes arms 180 and 182 extending arcuately in opposite directions from a center section 184 which includes an adjusting arm 186 extending radially outward through a slot 188 formed through the side wall 170. This permits arcuate movement of yoke 178 for adjusting purposes to be described. The yoke center section 184 has a socket 190 formed therein with a slot 192 extending radially outward therefrom into adjusting arm 186 for a short distance. Socket 190 has an arcuate inner surface provided through approximately 180° of arc and receives a mating round end 194 of a cam follower 196 received intermediate yoke arms 180 and 182 and in the plane thereof. The cam follower is formed from a plate preferably having slightly less thickness than the plate from which the adjusting yoke 178 is formed so as to prevent any binding action between the cam follower and adjacent portions of the flange 172 and shoulder 168. An oval cam-following slot 198 is formed in cam follower 196 with the ends thereof having arcuate surfaces and one of the ends being provided with an opening to divide the sides of the oval into separate sections so that they appear as arms 200 and 202. Arm 202 may be formed in a hook-like manner with the hook end 204 first extending inwardly toward slot 198 and then being bent out of the plane of the cam follower to provide a spring-attaching lug 206. The end 208 of spring 158 may be hooked around this lug so that movement of cam follower 196 about its pivot point 210 at the center of its round end 194 will result in modification of the torsional tension of spring 158.

Control knob 66 has an eccentrically mounted and preferably circular cam 212 formed thereon and extending from the inner face of flange 172 so that its axis 214 is parallel to and rotatable about the knob axis 216. Knob axis 216 is in alignment with the axis of shaft 136. An extension 218, which has a circular cross section better illustrated in FIGURE 5, extends from one side of cam 212 so that it has its axis in alignment with the knob axis 216. A spring seat cup 220 is received about extension 218 and provides a seat for spring 158. The end of extension 218 extending toward spring seat cup 156 is provided with a lug 222 which is engageable with a tab 224 struck out of a portion of cup 156. In the assembled position lug 222 is engageable with the tab 224 when knob 66 is rotated so that the pointer 68 indicates the "off" position of the control knob illustrated in FIGURE 4. This positively rotates cup 156 and, therefore, shaft 136 and disk 134 to render the control head inoperative to control the throttle valve 16, as will be described. The flange 162 of cup 156 is preferably provided with a series of arcuately spaced indexing holes 226 with the spring end 160 being received in an appropriate one of the holes to preset the torsional tension of spring 158 in relation to the desired position of driven disk 134. To facilitate assembly of spring cup 220 over lug 222, the circular aperture surrounding extension 218 is provided with a keyhole type slot 228 having the same shape as the cross section of lug 222 but out of alignment therewith in the normally assembled position. Assembly is accomplished by rotating cup 220 until slot 228 can receive lug 222 therethrough after which the assembly is rotated to the assembled position.

The speed set adjusting mechanism illustrated in FIGURES 3, 4, 6 and 7, permits small increments of arcuate movement of the spring end 208 for large increments of arcuate movement of the knob 66 since the eccentric cam 212 moves the cam follower 196 with its round end 194 pivoting in socket 190 of the adjusting yoke 178. The eccentric cam 212 moves from the lower position, illustrated in FIGURE 7 to a diametrically opposite position, or upper position, while imparting a maximum angular movement to cam follower arm 202, and therefore spring end 208, of about 20° to 30° about the pivot point 210. Adjusting yoke 178 can be moved by external adjustment through arm 186 to angularly adjust the pivot point 210 and provide a setting so that the pointer 68 of knob 66 will indicate exactly the desired speed at which the vehicle is to travel.

Wall 140 may be constructed as an open web or may be provided with one or more openings 230 connecting chamber 166 with chamber 94. Both of these chambers are at atmospheric pressure since atmospheric air enters chamber 166 through slot 188. Driven disk 134 is provided with a pin 232 extending outwardly therefrom in axially parallel relation to shaft 136 and into one of the openings 230. This opening is of such diameter that it provides position limits for arcuate movement of pin 232 and, therefore, of disk 134 under influence of magnet 126 and spring 158. The limiting positions are best illustrated in FIGURES 8, 9 and 10.

A flat valve 234 is rotatably secured to the face 236 of wall 140 by the pivot pin 238. Valve 234 is best illustrated in FIGURES 8, 9 and 10. Its lower end 240 is provided with a slot 242 through which pin 232 is received so that the pin may reciprocate slightly along the length of the slot as the pin moves arcuately under influence of magnet 126. This arcuate movement moves valve 234 to one of the positions shown in FIGURES 8, 9 and 10, or some intermediate position between those shown.

Valve 234 is preferably made of Mylar, a polyester resin which is the reaction product of terephthalic acid and ethylene glycol. This type material is preferred due to its physical characteristics of strength and weight and its low coefficient of friction particularly when installed as is valve 234. It is, of course, obvious that other suitable low friction materials may be used. Low friction between valve 234 and wall face 236 is of importance, however, to prevent or diminish, insofar as possible, any hysteresis effects due to frictional drag of the valve so that the position of the valve would not reflect immediately and fully the angular position of driven disk 134.

The end of valve 234 opposite slot 242 is provided with an orifice control arm 244 which is movable across the orifice 246 provided through wall 140 and connecting with a chamber 248 formed in housing 164. A passage 250, also formed in housing 164, may connect chamber 248 to the passage 252 of control conduit 62. Passage 250 is sufficiently large to permit fluid flow between chamber 248 and passage 252 without further restriction, when considering the restrictive flow characteristics of orifice 246 and other orifices in the control system to be described. An insert 254 is provided in an intermediate portion of chamber 248 so that it does not interfere with orifice 246 and passage 250. A control-limiting orifice 256 is provided in insert 254 to connect the upper end 258 of chamber 248 with the lower portion thereof connecting with orifice 246 and passage 250.

The chamber upper end 258 is formed in the face 260 of the outer side of housing 164 above the lower part of chamber 248 so that the portion of chamber end 258 adjacent the plane of the face is annular with a boss 262 extending through the center thereof. Boss 262 has a recess 264 formed therein and extending downwardly from the plane of face 260. An open slot 266 is formed across one side of boss 262 so that it connects recess 264 with the chamber upper end 258. This slot may be formed in any suitable manner, but it has been found to be particularly desirable to form it with a V cross section having a closely controlled cross-section area and open in the plane of face 260. The area of slot 266 below the plane of face 260 will define an orifice having a smaller cross-section area than limiting orifice 256 when the open side of the slot is closed. A diaphragm and gasket 268, also preferably formed of Mylar, is received on face 260 and retained thereon by cover 270. Raw vacuum conduit 90 may be provided as an integral part of cover 270. The cover may be secured to the housing 164 by any suitable means such as screws 272. Diaphragm 268 is provided with an orifice 274 aligned with recess 264 and having a cross-section area greater than the effective cross-section area of slot 266 below face 260, but less than the cross-section area of limiting orifice 256. When diaphragm 268 engages the boss 262 on the face 260, it closes up the top of slot 266 so that that slot becomes effective as a control orifice. Conversely, when diaphragm 268 is in spaced relation to the boss on the face 260, the top of slot 266 is open and the slot is ineffective as a control orifice.

A chamber 276 is provided in cover 270 and defined by that cover and diaphragm 268. It preferably has the same diameter as does the upper chamber end 258. A recess 278 is provided in cover 270 and connects with chamber 276 and the passage 280 in conduit 90. A plunger 282 is received in recess 278. This plunger has a head 284 larger in diameter than recess 278 and extending into chamber 276 and having a spherical or similar curved section surface 286 engaging diaphragm 268. A passage 288 extends through plunger 282 along the axis thereof and is in alignment with orifice 274 and recess 264 to provide a fluid flow passage from passage 280 to orifice 274. A plunger spring 290 is received about the plunger shank 292 within recess 278 and is seated at the bottom of the recess adjacent passage 280. It acts against the backside of plunger head 284 to keep the plunger surface 286 in engagement with diaphragm 268 around orifice 274. Fluid pressure from passage 280 can, therefore, pass through recess 278 and into chamber 276 to act on diaphragm 268 and can also pass through passage 288 and orifice 274 directly to the chamber upper end 258 when the diaphragm is not in engagement with boss 262, or from orifice 274 through recess 264 and the effective orifice formed by slot 266 and diaphragm 268 when the diaphragm engages face 260 of boss 262. Diaphragm 268 is, therefore, subject to pressures in chamber end 258 and chamber 276 to move plunger 282 against the force of spring 290 and adjust the diaphragm position in relation to boss 262. The slot orifice 266 is, therefore, the controlling orifice when diaphragm 268 engages boss 262. Orifice 274 is the controlling orifice when diaphragm 268 is spaced from boss 262 the full stroke limit of plunger 282. Diaphragm 268 has an intermediate series of positions wherein the effective controlling orifice is the varying orifice section area of slot 266 and the space between face 260 of boss 262 and the adjacent surface of diaphragm 268. This mode of operation is described below with regard to FIGURE 11.

The speed setting and adjusting mechanism is illustrated in FIGURES 3 and 4 in the speed "off" position while the degenerative feedback portion of the control head associated with diaphragm 268 is illustrated in the position assumed when the vehicle is below a set speed. Assuming that the vehicle speed is set for 50 m.p.h. and that the vehicle is traveling under its own engine power at a speed of 30 m.p.h. the system is not controlling vehicle speed and is unable to accelerate the vehicle under system control to the set speed. Raw engine vacuum is transmitted through conduits 92 and 90, passage 280 and recess 278 to the chamber 276. This pressure is also transmitted through passage 288 to restrictive orifice 274. This orifice so restricts the pressure that a higher absolute pressure exists in chamber 258. When the vehicle engine was started and the raw vacuum was first introduced into chamber 276, it permitted the higher pressure in chamber 258 to act against diaphragm 268 and to lift the diaphragm off of the face 260 of boss 262 against the action of spring 290. At that time slot 266 was rendered ineffective as a control orifice. Atmospheric air enters orifice 246 and chamber 248, including its upper end 258. Since chamber 248 is at atmospheric pressure, servo control chamber 42 is also at atmospheric pressure. With atmospheric pressure on both sides of diaphragm 40 of the servo, and having been on both sides thereof at all times from a time prior to the cranking of the engine when the throttle linkage including throttle link 26 was in the zero throttle position, diaphragm 40, arm 48, rod 28 and the rod end 32 are also in the zero throttle position. The vehicle operator is controlling the speed of the engine 10 through the accelerator pedal 24 and the throttle linkage. Pin 30 slides along rod 28 as the throttle link 26 is moved concurrently with throttle valve 16 so that the servo 34 has no effect on throttle operation.

As the vehicle reaches a speed approximately 5 miles below the set speed of 50 m.p.h., valve 234 begins to close orifice 246 by moving in the counterclockwise direction, as seen in FIGURE 8, since pin 232 moves in the clockwise direction, as seen in that figure, under influence of the speed pickup mechanism including driven disk 134 and magnet 136 which rotate in the direction for this result to occur as the vehicle speed increases. The closing of orifice 246, thereby restricting the admission of atmospheric air into chamber 248, causes a lower absolute pressure to exist in that chamber and chamber end 258 since those spaces are being evacuated through orifice 274. This lower absolute pressure is also provided in control pressure chamber 42 of the servo 34 since that chamber is connected to chamber 248. Diaphragm 40 then moves to the left, as seen in FIGURE 1, causing throttle valve 16 to be opened when rod end 32 engages pin 30 and continued movement of the diaphragm 40 occurs. This causes a further increase in vehicle speed so that orifice control arm 244 of valve 234 entirely closes orifice 246 and moves to the other side of the orifice, then beginning to open the orifice. The valve 234 has, at this stage, passed through the condition shown in FIGURES 8 and 9, and is moving to the left side of orifice 246 toward the position shown in FIGURE 10. As arm 244, in its continued movement, opens orifice 246 to a greater extent, the absolute pressure in control chamber 42 increases due to the modulating effect of arm 244 on orifice 246 by atmospheric air modification. This increase in absolute pressure moves diaphragm 40 to the right, letting the throttle close slightly and holding the diaphragm 40 in a position so that the vehicle is maintained at the set speed. Should the actual vehicle speed increase slightly, valve arm 244 will move counterclockwise, as seen in FIGURES 8, 9 and 10, to further open orifice 246, thereby increasing further the absolute pressure in chamber 42 and permitting further closure of throttle valve 16 under the force of throttle return spring 116. If the vehicle speed decreases slightly from the set speed, valve arm 244 will move clockwise slightly to close orifice 246 to some extent, thereby decreasing the absolute pressure in servo chamber 42 and causing diaphragm 40 to move rod 28 to the left and increase the opening of throttle valve 16 to increase the vehicle road speed until the set control speed is again attained. As orifice 246 is closed to some extent in this manner, the absolute pressure in chamber 248 and its upper end 258 decreases acting on diaphragm 268 to move the diaphragm toward the face of boss 262 so that the smaller orifice 266 becomes the controlling orifice admitting raw vacuum into chamber end 258 instead of orifice 274. The clearance between the lower surface of diaphragm 268 and face 260 of boss 262 decreases as this action occurs and a range of operation is attained wherein the net effect is the provision of a variable controlling orifice intermediate the sizes of orifices 266 and 274. Therefore, the action of orifices 266 and 274, diaphragm 268 and the pressures in chamber end 258 and chamber 276 provide a degenerative or negative feedback system which eliminates system hunting.

Operation of the orifices 266 and 274 and the effective varying of the size of orifice 266 in the speed controlling range of operation is shown in the graph of FIGURE 11 wherein the control pressure signal transmitted to the servo 34 through passage 252 is plotted against absolute pressure provided through passage 280 from the engine intake system while assuming that the vehicle will maintain a constant speed. These conditions are primarily test conditions which can be made to occur best under bench test conditions, but the results obtained clearly show the modulating effect obtained. The heavy curve 294 indicates the plotted control pressure in p.s.i.a. Line 296 indicates the control pressure obtained when operating the system with orifice 266 acting as the system controlling orifice, with diaphragm 268 engaging the face 260 of boss 262. Line 298 represents a similar condition when orifice 274 is the controlling orifice. Point 300 indicates the point at which atmospheric pressure is provided in conduits 60 and 92 because the vehicle engine is not operated. As the absolute manifold pressure decreases when the engine is running, the control pressure curve 294 follows line 296 to point 302, at which time the absolute pressure in chamber 276 is sufficiently less than the absolute pressure in chamber upper end 258 to initiate the movement of diaphragm 268 from the face of boss 262. The effective variation of the area of orifice 266 continues until point 304 is reached at which time orifice 274 becomes the controlling orifice. The control pressure signal curve 294 continues along line 298. It is, therefore, clear that between points 302 and 304 a modulating effect is provided in a degenerative feedback system which is a function of the absolute pressure furnished the control head from the engine intake system.

Orifice 256 is provided in chamber 248 and separates the upper end 258 from the lower end thereof but, being larger than orifices 266 and 274, has no effect on the pressure signal in various portions of the chamber unless diaphragm 268 is ruptured so as to accidentally provide an orifice having greater area than orifice 256. Orifice 256 would then become a controlling orifice which would permit operation of the system without any feedback characteristics and at a lower control speed than the set speed.

In order to relieve the vehicle operator of the accelerator pedal control whenever he chooses to operate the vehicle automatically at a preselected speed, the operator will manually preset the speed by the use of knob 66 to torsionally tension spring 158 as a function of the preset speed. He then manually brings the vehicle to a speed within the range of sensitivity of the control head, this range being provided by the manner in which valve 234 operates to control orifice 246. Once within this range of sensitivity, the system operates to bring the vehicle to the preselected speed and maintains the vehicle at that speed. The automatic mode of operation may be temporarily interrupted at any time by the normal operation of any of the usual vehicle controls such as the brake, clutch and accelerator pedals. If the vehicle operator moves the accelerator pedal 24 to increase the vehicle speed above the preselected speed while the system is controlling the vehicle speed, he will move throttle link 26 and pin 30 in freely sliding relationship to rod 28 and the throttle valve 16 will be opened. The resulting increase in vehicle speed will, of course, act on valve 234 and that valve will cause a signal to be sent to servo 34 tending to close the vehicle throttle. However, this only results in the potential movement of rod 28 toward the closed throttle position and has no effect on the throttle valve since rod 28 merely slides freely in relation to pin 30 and throttle link 26. After the operator has accelerated well above the set speed and then desires to return to the set speed, he merely removes his foot from the accelerator pedal 24. The throttle valve 16 will then move toward the closed position under influence of throttle return spring 116 until pin 30 engages the end 32 of rod 28. This engagement may occur at the last throttle controlling position of the servo 34 since it has been conditioned to permit spring 116 to return it to the zero throttle position in an ineffectual attempt to decrease vehicle speed while the operator is accelerating. Spring 116 will return throttle valve 16 and the diaphragm 40 of the servo to the zero throttle position. As the vehicle speed decreases under zero engine throttle operation, the system will return to the range of control sensitivity wherein valve 234 again controls orifice 246. This will occur a few miles above the preset speed so that the system will smoothly bring the vehicle to the preset speed. Servo 34 will be smoothly actuated to open the throttle valve 16 and to move that valve under speed and load demand varying conditions so as to maintain the vehicle at the desired speed.

When spoiler valve assembly 96 is actuated to introduce atmospheric pressure into chamber 42 of servo 34, spring 116 immediately returns the servo and the throttle valve 16 to the zero throttle position. If spoiler valve 108 is held open until the vehicle speed decreases below the range of control sensitivity and is then closed, valve 234 will not be able to control orifice 246 and the control will not resume its automatic operation until the vehicle operator has again brought the vehicle speed into the range of control sensitivity. If valve 108 is closed while the vehicle speed is still in the range of control sensitivity, the system will return the vehicle to the set speed.

If the vehicle operator desires to eliminate possible automatic operation of the system, he turns the knob 66 so that the pointer 68 is in the "off" position indicated by FIGURE 4. This causes lug 222 to engage tab 224 and forcibly hold the driven disk 134, and thus valve 234, in a position wherein the speed of the vehicle has no effect thereon and orifice 246 remains fully open. In effect, it sets the range of sensitivity positively out of the vehicle speed range. Atmospheric pressure is, therefore, admitted to the servo chamber 42 through orifice 246 and is sufficiently unrestricted to prevent the servo from being actuated. In order to indicate the speed set positions, as well as the "off" position, the circumferential surface of flange 172 of knob 66 may be provided with a series of notches 306 which are selectively engageable by a cantilever-anchored spring pin 308 mounted in the housing 164 as is best seen in FIGURE 6. The operator may, therefore, be able to feel the speed settings without looking at the dial and can readily obtain desired speed increments which are illustrated as being spaced at 10 m.p.h. increments. When pin 308 is not engaging any of the notches 306, other speed settings intermediate the speed settings corresponding to the notches are obtainable and the pin tends to hold knob 66 in that position due to the biasing force exerted by it on the flange circumference.

A system has, therefore, been provided which has two differing fluid pressures and means for damping and modifying one of the pressures in accordance with vehicle speed error from a desired speed and a power servo for controlling the vehicle engine throttle to decrease the vehicle speed error to zero. The structure for damping one of the fluid pressures and the structure for modifying the damped fluid pressure act in parallel on the fluid pressures used to provide the control pressure for the servo and provide a dynamic fluid pressure system wherein there is continuous fluid flow during the control operation with a substantially static fluid being maintained in the servo control chamber and moving only to the extent that the chamber area is changed under influence of the control pressure received from the dynamic fluid pressure portion of the system. A safety limiting orifice is provided so that if the damping mechanism acting on one of the fluid pressures is not properly operable due to damage thereto, the system will not suddenly react adversely but will continue to have a modified control action. The system may be rendered inoperative by the vehicle operator in several manners including acceleration beyond the control range of sensitivity extending on either side of the preset speed, braking action of the vehicle, clutching action if a clutch is provided, or setting the control to an inoperative condition by either rendering it positively inoperative or by moving the preset speed and, therefore, the range of speed sensitivity sufficiently away from the actual speed to remove the actual speed from the range of control sensitivity. If, however, the vehicle operator desires to change the set speed while maintaining automatic control, he may move the preset speed in a sufficiently slow manner to permit the system to change the actual vehicle speed during such movement so that it does not pass out of the range of control sensitivity being shifted.

We claim:

1. In a dynamic fluid pressure system having a first fluid pressure source for producing a first variable pressure and a second fluid pressure source for producing a second pressure greater than said first pressure, fluid pressure modification mechanism comprising a chamber, first means metering said first pressure into said chamber in inverse relation to variations in said first pressure, second means metering said second pressure into said chamber and producing therein a control pressure intermediate said first and second pressures, and means in series with and intermediate said first means and said chamber for limiting the metering action of said first means.

2. In a fluid pressure control system having a substantially constant first pressure input and a variable second pressure input less than said first pressure input and a control pressure output ranging between and including pressure limits defined by said first and second pressure inputs, a control head having a control pressure output chamber and an output passage therefrom, first orifice means connecting said first pressure input with said chamber, control valve means for modulating said first pressure input through said first orifice means in accordance with a sensed condition, second orifice means restrictively admitting said second pressure input to said chamber, a movable member differentially responsive to said second pressure input and the pressure in said chamber, and third orifice means having a variable area controlled by said movable member within orifice area limits including a lower limit of lesser area than the orifice area of said second orifice means and an upper area limit greater than the orifice area of said second orifice means, said third orifice means actuable on said second pressure input intermediate said second orifice means and said chamber.

3. The fluid pressure control system of claim 2 further comprising second pressure input limiting means intermediate said third orifice means and said control pressure output passage.

4. A speed control head for a speed control system, said head having first and second differing fluid pressure inputs, said first fluid pressure input being a constant pressure and said second pressure input being a variable pressure, an actual speed input, a desired speed input, a fluid pressure output, a speed controlling range of action substantially centered about said desired speed input, first means for modulating the first of said pressure inputs in accordance with the speed differential between said speed inputs, second means mechanically independent of said first modulating means for modulating the second of said pressure inputs over and in response to changes throughout a substantial range of second input pressure variation to provide a negative feedback to said actual speed input, and means for operatively disconnecting said first modulating means including mechanism for setting a desired speed input to establish said speed controlling range of action beyond said actual speed input.

5. A valve control for a valve having a first condition sensing input and a second desired condition input and comprising torque producing means reflecting said first input, variable torque resisting means resisting said torque producing means and reflecting said second input, and means for varying said variable torque resisting means including a movable member movable throughout a first arcuate range about a pivot point and a control for said movable member including an eccentric cam and cam follower connected in following relation therewith, said cam being movable rotatably and translationally in an arcuate path throughout a second arcuate range greater than said first arcuate range.

6. The valve control of claim 5 further comprising means for moving the pivot point of said movable member to linearly adjust said first arcuate range relative to said second arcuate range.

7. A speed sensitive valve mechanism for controlling admission of fluid pressure to a chamber having a wall and comprising, an orifice through said wall, a flat orifice control valve pivotally attached to said wall for arcuate movement on one surface of said wall and in engagement therewith to variably open and close said orifice, and a speed sensor reflecting a sensed speed by arcuate movement and interconnected with said valve to move said valve and variably open and close said orifice as a fuunction of the sensed speed.

8. A vehicle road speed control system for a vehicle powered by an internal combustion engine having a source of fluid pressure differing from atmospheric pressure and a throttle valve for varying the delivered speed and power of the engine to the vehicle and operatively changing the fluid pressure from the fluid pressure source; said system comprising; a static control pressure-operated servo operatively connectable to the engine throttle valve to move under influence of control pressure to open the throttle valve; a control head having a dynamic fluid pressure input connectable with the engine source of fluid pressure to receive fluid pressure therefrom, a dynamic atmospheric pressure input, a desired vehicle road speed input, an actual vehicle road speed input, a static control pressure output having upper and lower limits defined by said pressure inputs and connected with said servo, first movable means for modulating said atmospheric pressure input as a function of said actual vehicle road speed input and said desired vehicle road speed input, and second movable means movable independently of movement of said first movable means for modulating said dynamic fluid pressure input in response to said dynamic fluid pressure input and said static control pressure output to degeneratively feed back through said control pressure output and said servo and the movement of the engine throttle to the engine source of fluid pressure to damp out overshoot characteristics in said servo; and means acting on one of said inputs to render said control system inoperative to produce a control pressure at said servo other than substantially atmospheric pressure.

9. In a dynamic fluid pressure system having a first fluid pressure source for producing a first fluid pressure and a second fluid pressure source for producing a second pressure greater than said first pressure; fluid pressure modification mechanism comprising; a chamber, first metering means for metering said first pressure into said chamber; second metering means for metering said second pressure into said chamber and producing therein a control pressure intermediate said first and second pressure; said first metering means comprising, a first metering orifice active at a first pressure differential limit, a second metering orifice active at a second pressure differential limit, and fluid pressure differential responsive force producing means positioned to receive on opposite sides thereof said first pressure and control pressure and responsive to the pressure differential therebetween for establishing one or the other of said first and second metering orifices as the effective metering orifice for said first pressure.

10. The system of claim 9, said first metering orifice effectively metering said first pressure into said chamber above the larger of said pressure differential limits and said second metering orifice effectively metering said first pressure into said chamber below the larger of said pressure differential limits.

11. The system of claim 9, said first metering orifice being formed through said fluid pressure differential responsive force producing means.

12. The system of claim 9, said first and second metering orifices being in series, and said fluid pressure differential responsive force producing means being active over a range of operation of said system determined by said pressure differential limits to continuously vary said second metering orifice intermediate said pressure differential limits in accordance with the pressure differential acting thereon throughout said range and to maintain said second metering orifice as the effective metering orifice below the larger of said pressure differential limits.

13. The system of claim 9 further including a boss having a surface engageable by said fluid pressure differential responsive force producing means and having a groove formed in said surface cooperating with said fluid pressure differential responsive force producing means to define said second metering orifice.

14. The system of claim 9, said second metering orifice being a groove having a predetermined groove cross section area and positioned to have the open side thereof closed by said fluid pressure differential responsive force producing means at and below the smaller of said first and second pressure differential limits to limit the minimum orifice area thereof to the groove cross section area.

15. The system of claim 9, further including means in series with and intermediate said first metering means and said chamber for limiting the metering action of said first metering means.

16. The system of claim 15, said limiting means comprising a third orifice having a greater orifice area than said first metering orifice.

17. The system of claim 15, said limiting means comprising a third orifice having a greater orifice area than said first metering orifice acting at said first pressure differential limit and greater than said second metering orifice acting at said second pressure differential limit.

18. The system of claim 15, said limiting means comprising a third metering orifice having a greater orifice area than said first metering orifice and active to meter said first pressure at and above a third pressure differential limit greater than either of said first and second pressure differential limits should said first and second metering orifices become ineffective to meter said first pressure below said third pressure differential limit.

19. In a control system, a movable element for controlling a condition, servo means connected with said element for movement thereof, dual fluid pressure input control means for said servo for producing a control pressure for modulating movement of said movable element by said servo means in response to changes in said condition and comprising, first pressure movable pressure modulating means for producing a modulated output pressure from a first fluid pressure acting on and moving said first pressure modulating means in inversely proportional response to changes in said first fluid pressure, second pressure modulating means for a second fluid pressure acting to modulate the output pressure from said first pressure modulating means, and means controlling said second pressure modulating means in response to changes in the condition to be controlled, to produce said control pressure throughout a substantial range of changes in the condition to be controlled.

20. The control system of claim 19, further comprising limiting means effective on the pressure output of said first pressure modulating means to limit the output pressure therefrom should said first pressure modulating means fail to act on said first fluid pressure.

21. The control system of claim 19, said first and second pressure modulating means respectively acting on the first and second fluid pressures in parallel relation to produce said control pressure as the combined output pressures from said first and second pressure modulating means.

References Cited by the Examiner
UNITED STATES PATENTS

| | | | |
|---|---|---|---|
| 2,115,878 | 5/38 | Rodman. | |
| 2,324,191 | 7/43 | Bowers. | |
| 2,368,822 | 2/45 | Gardner | 123—103 |
| 2,708,979 | 5/55 | Reynoldson | 180—82.1 |
| 2,731,025 | 1/56 | Neuman. | |
| 2,737,165 | 3/56 | Thorner. | |
| 2,835,237 | 5/58 | Thorner. | |
| 2,880,706 | 4/59 | Price | 91—433 |
| 2,921,641 | 1/60 | Wetterhahn | 180—82.1 |
| 2,966,224 | 12/60 | Teetor | 180—82.1 |
| 2,990,825 | 7/61 | Fuller et al. | 180—82.1 X |
| 3,068,849 | 12/62 | Thorner | 123—103 |

A. HARRY LEVY, *Primary Examiner.*

PHILIP ARNOLD, *Examiner.*